Nov. 5, 1929.  C. N. BERGMANN ET AL  1,734,107
UNIT MEASURING MACHINE
Filed April 4, 1925   14 Sheets-Sheet 1

C. N. Bergmann INVENTORS.
E. Z. Taylor. C. Taylor.
John P. Jensen
W. A. Tenn
by C. M. Clarke ATTORNEY.

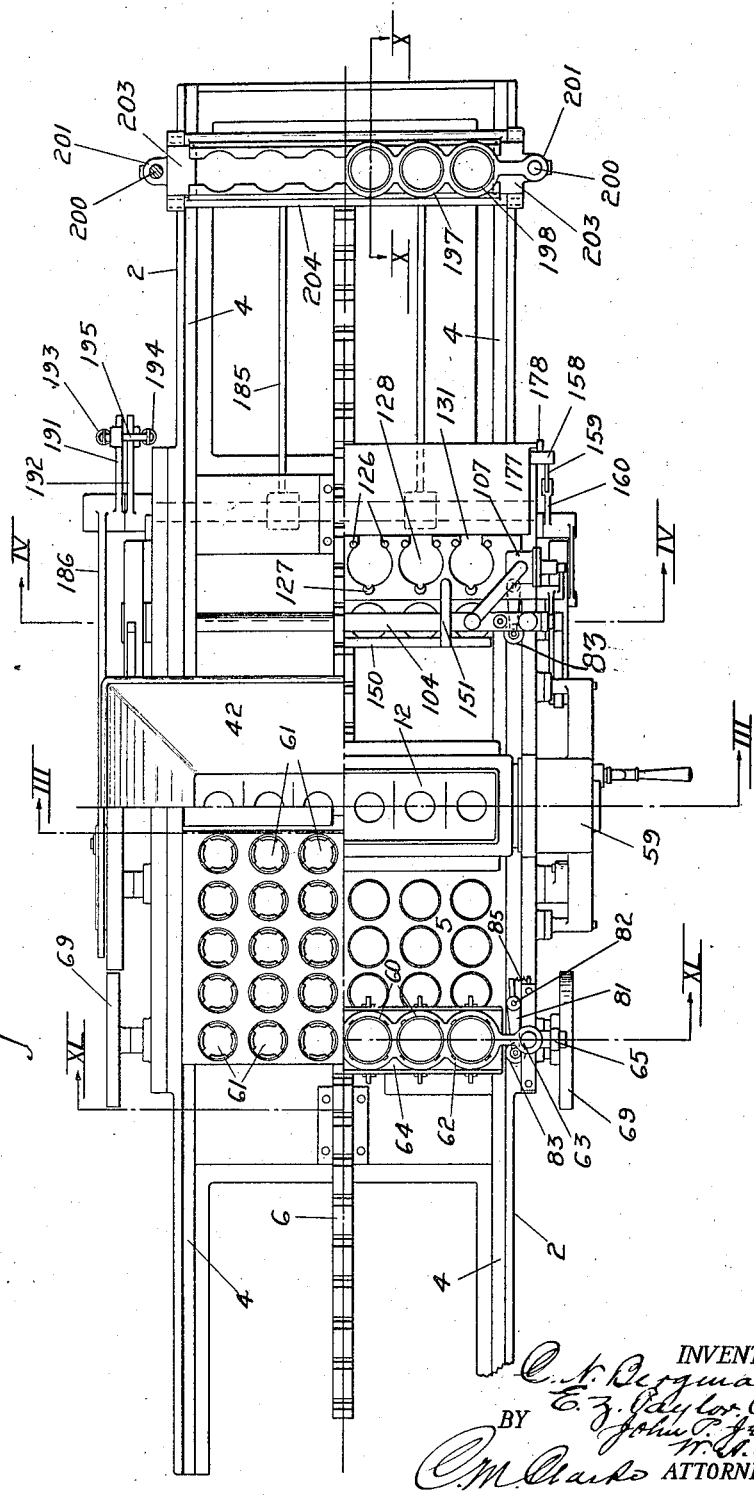

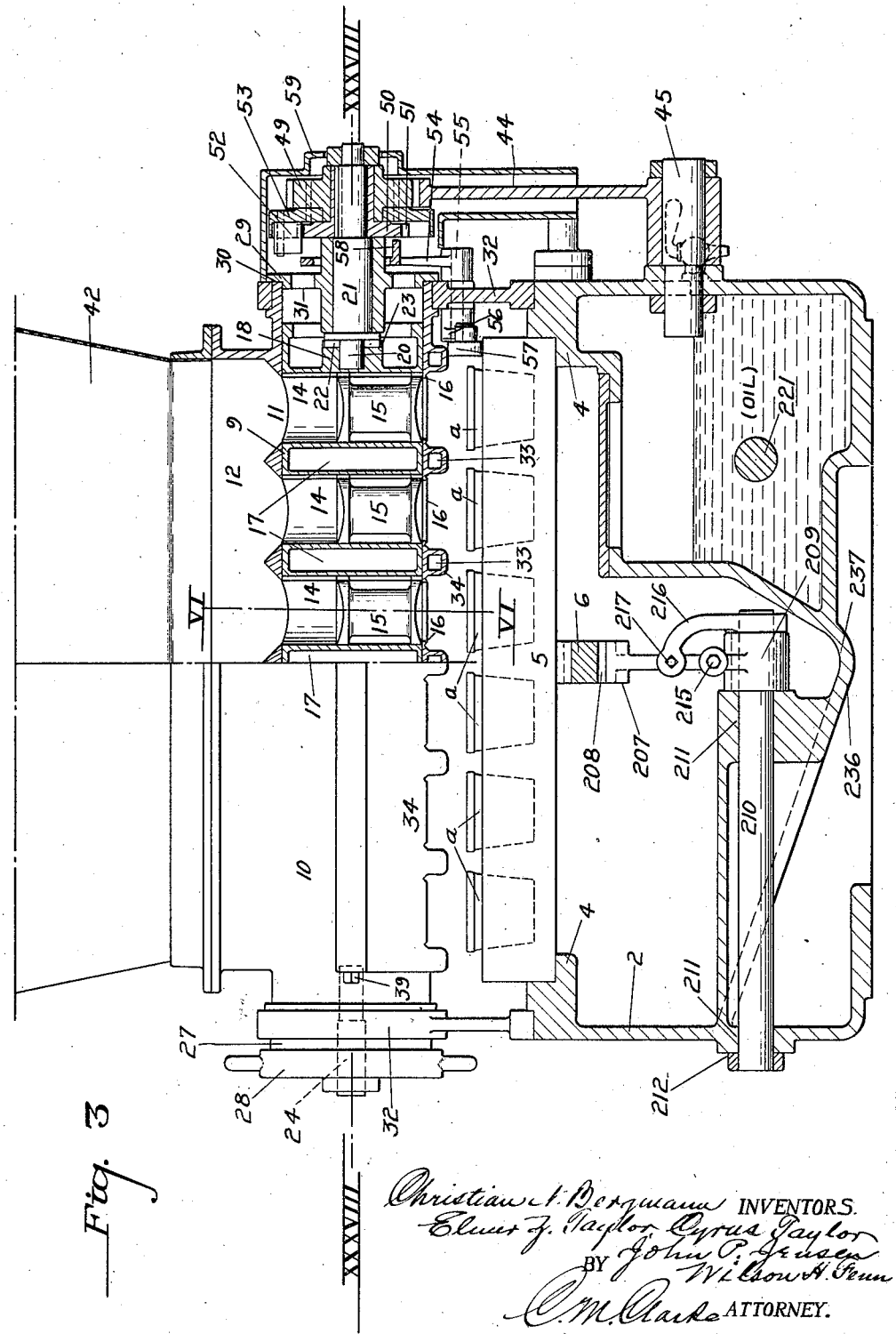

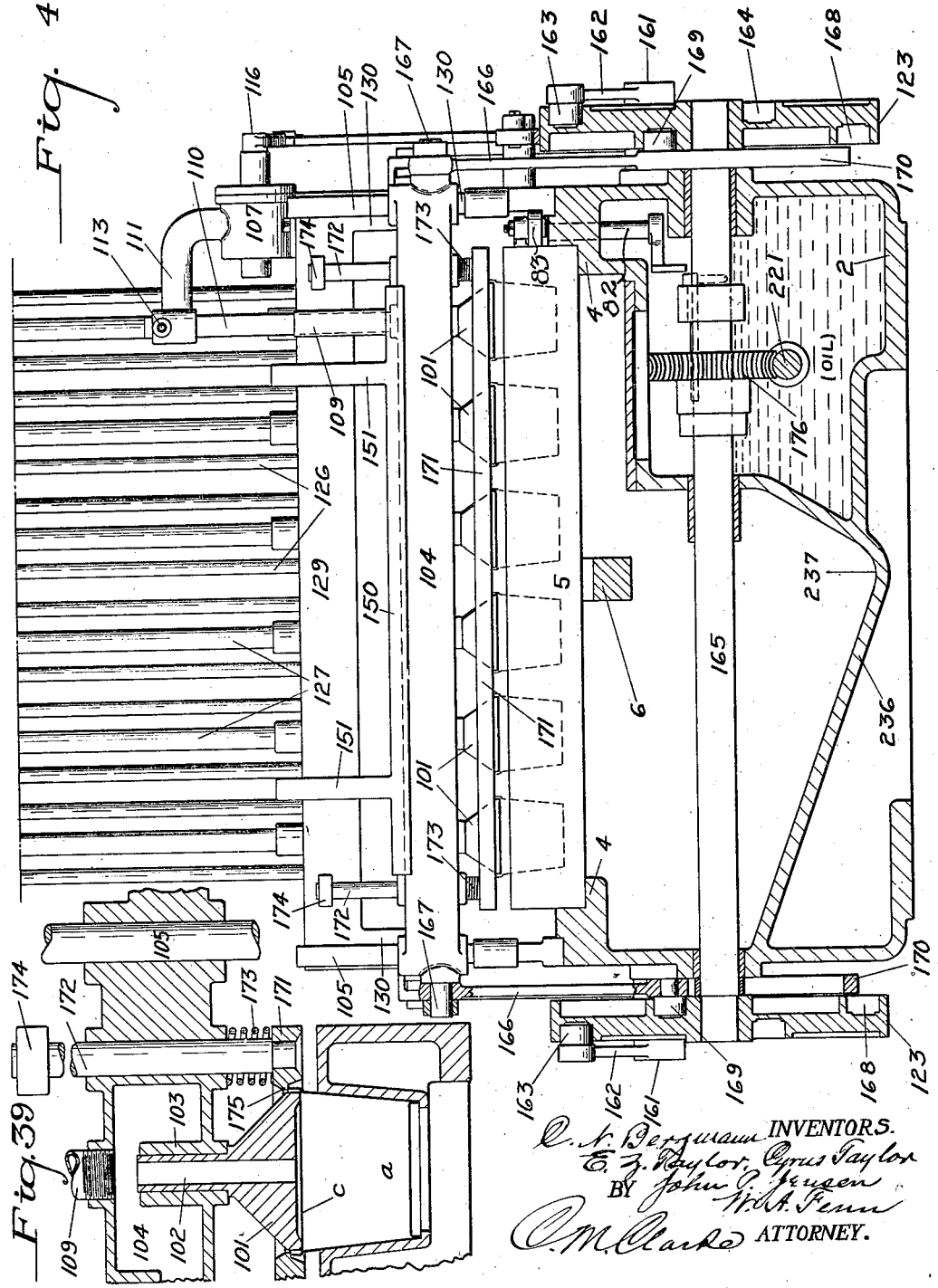

Nov. 5, 1929.　　C. N. BERGMANN ET AL　　1,734,107
UNIT MEASURING MACHINE
Filed April 4, 1925　　14 Sheets-Sheet 5
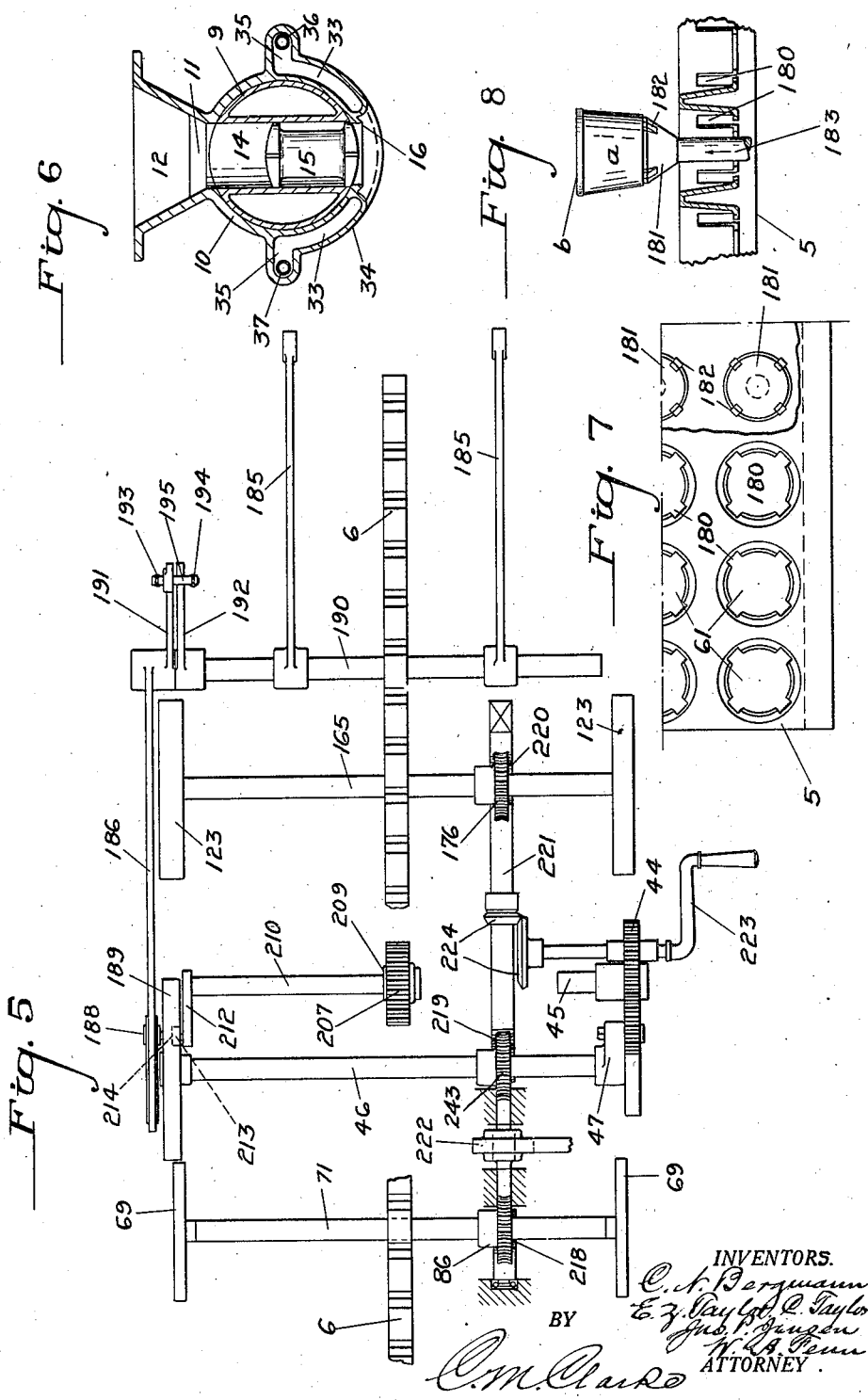

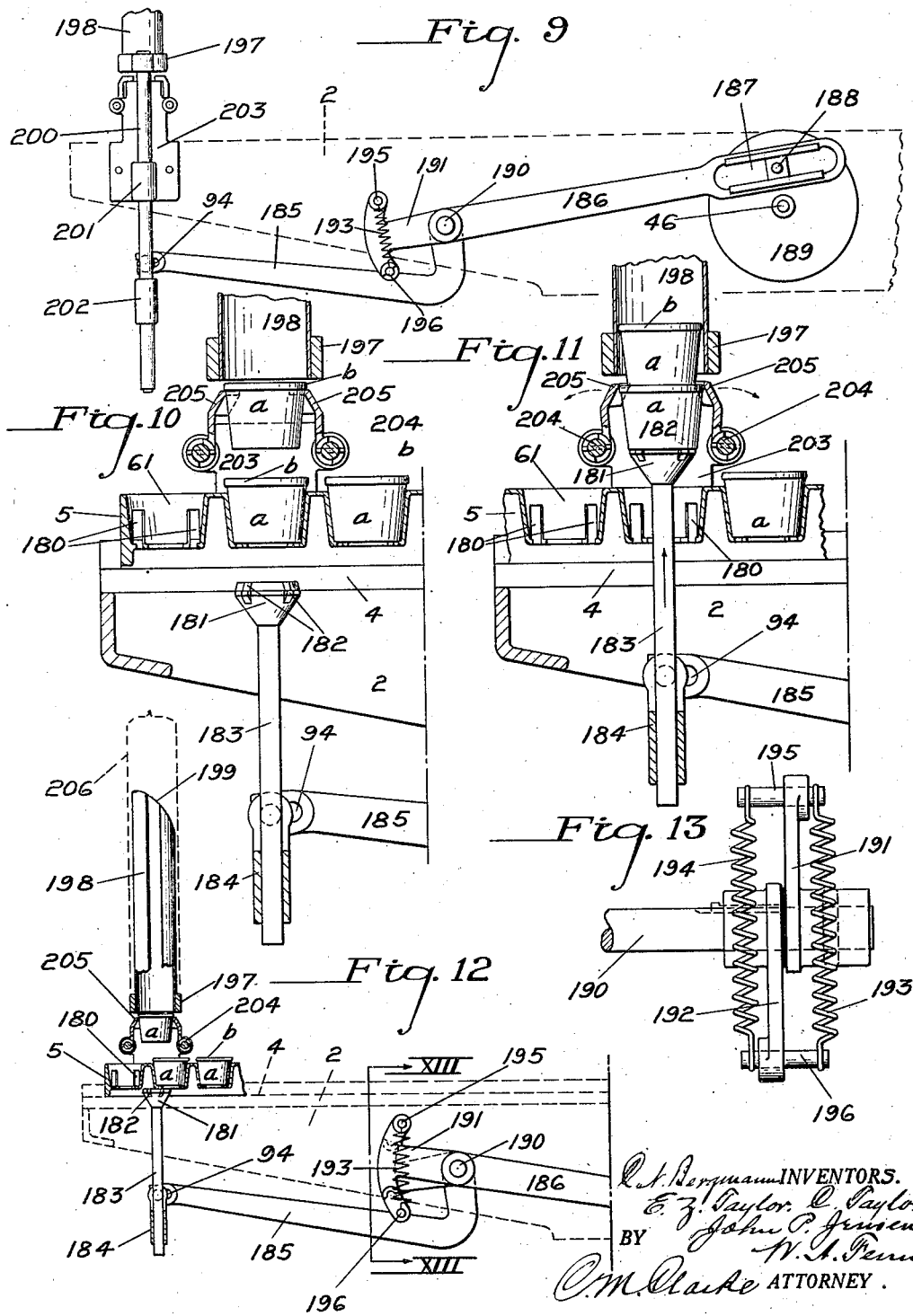

Nov. 5, 1929.  C. N. BERGMANN ET AL  1,734,107
UNIT MEASURING MACHINE
Filed April 4, 1925  14 Sheets-Sheet 7
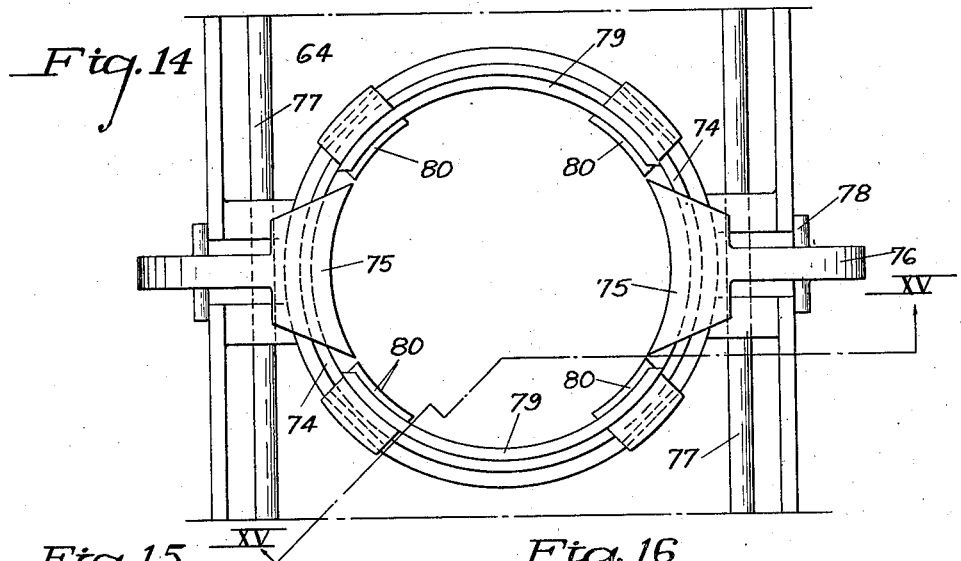
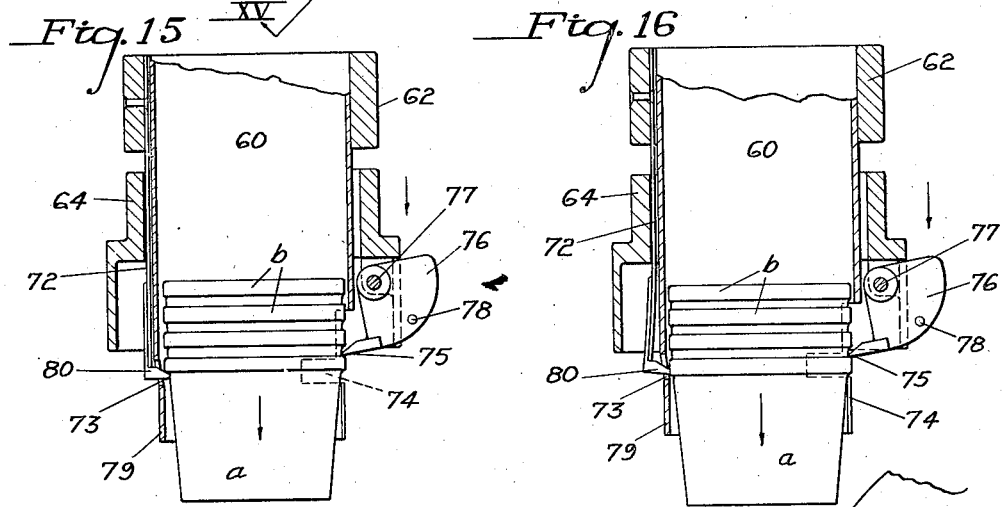
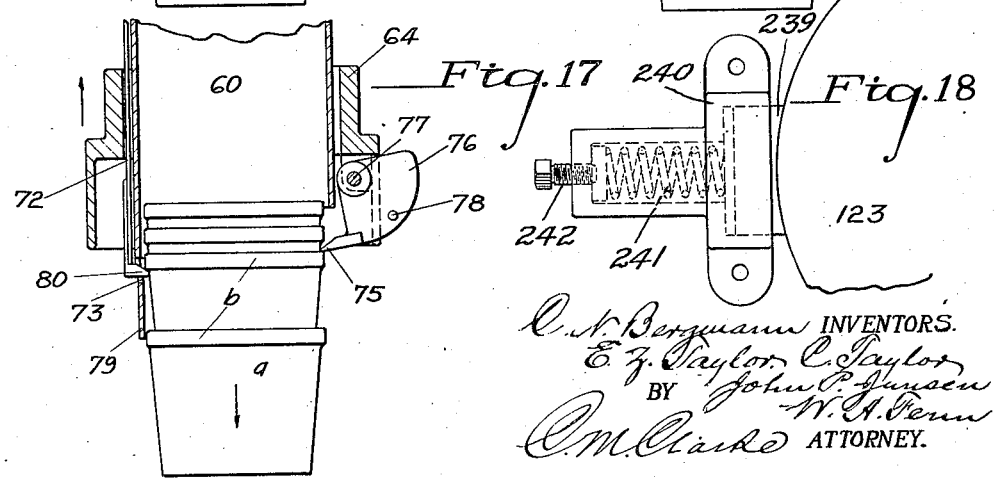

Nov. 5, 1929.  C. N. BERGMANN ET AL  1,734,107
UNIT MEASURING MACHINE
Filed April 4, 1925   14 Sheets-Sheet 9
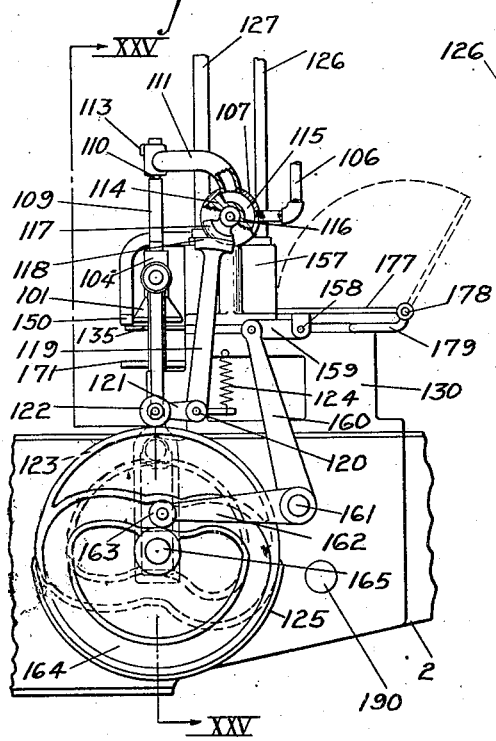
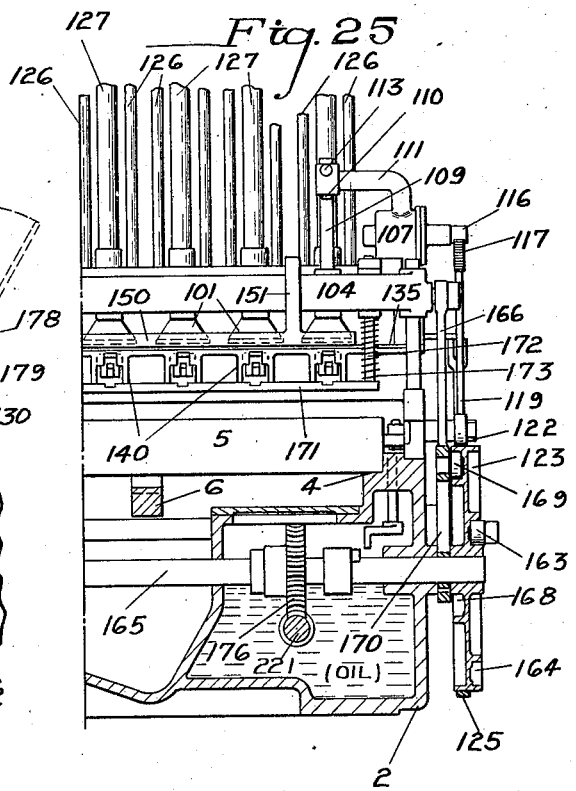
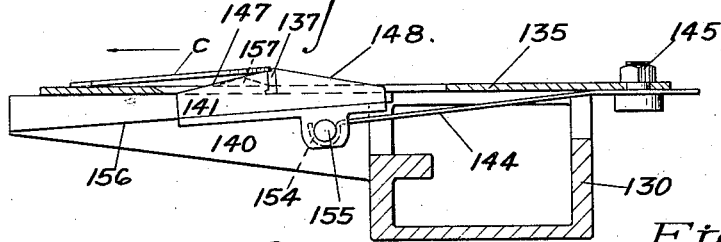
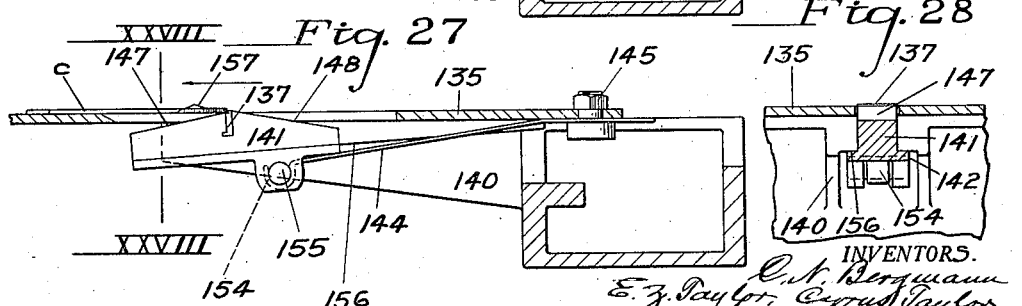

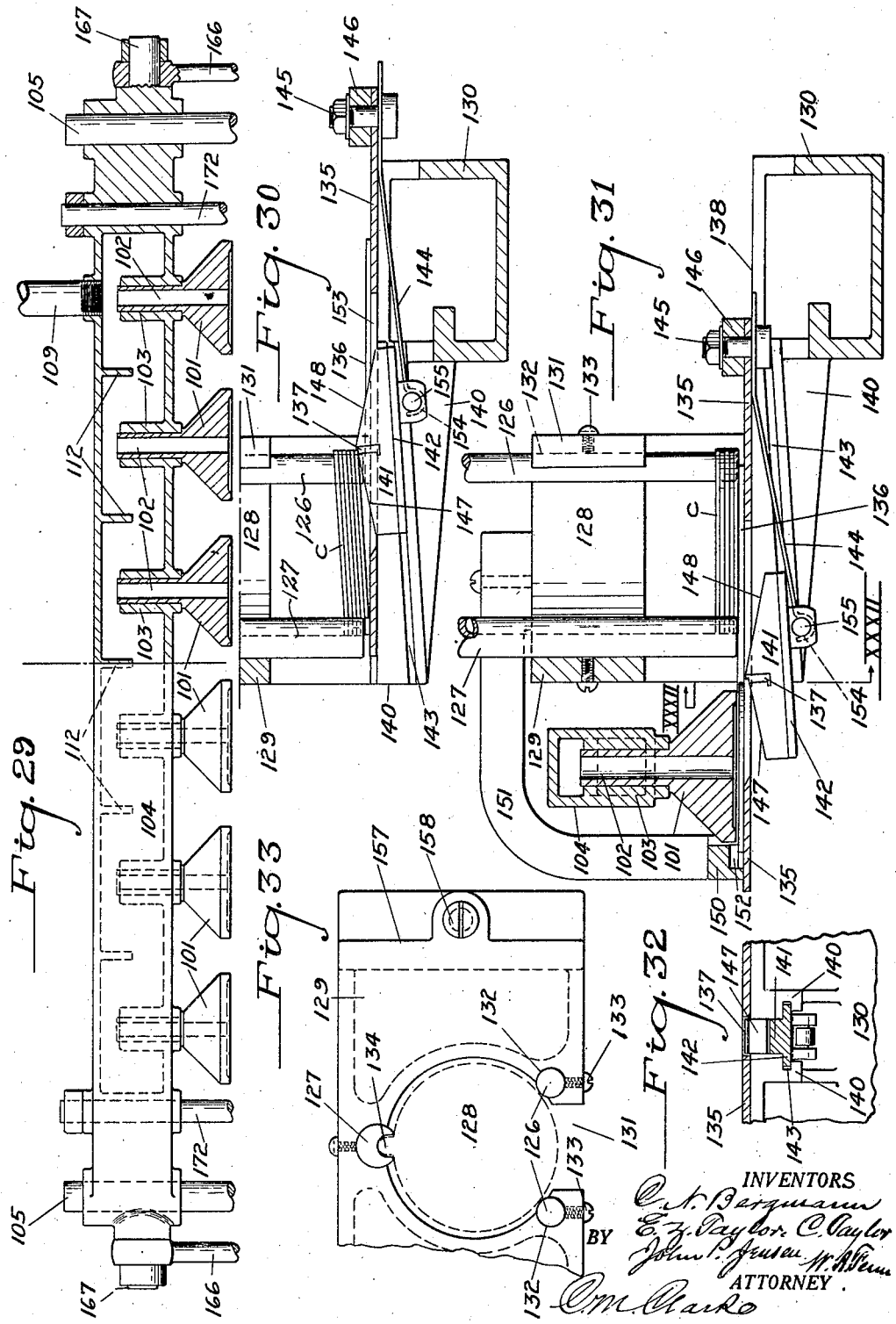

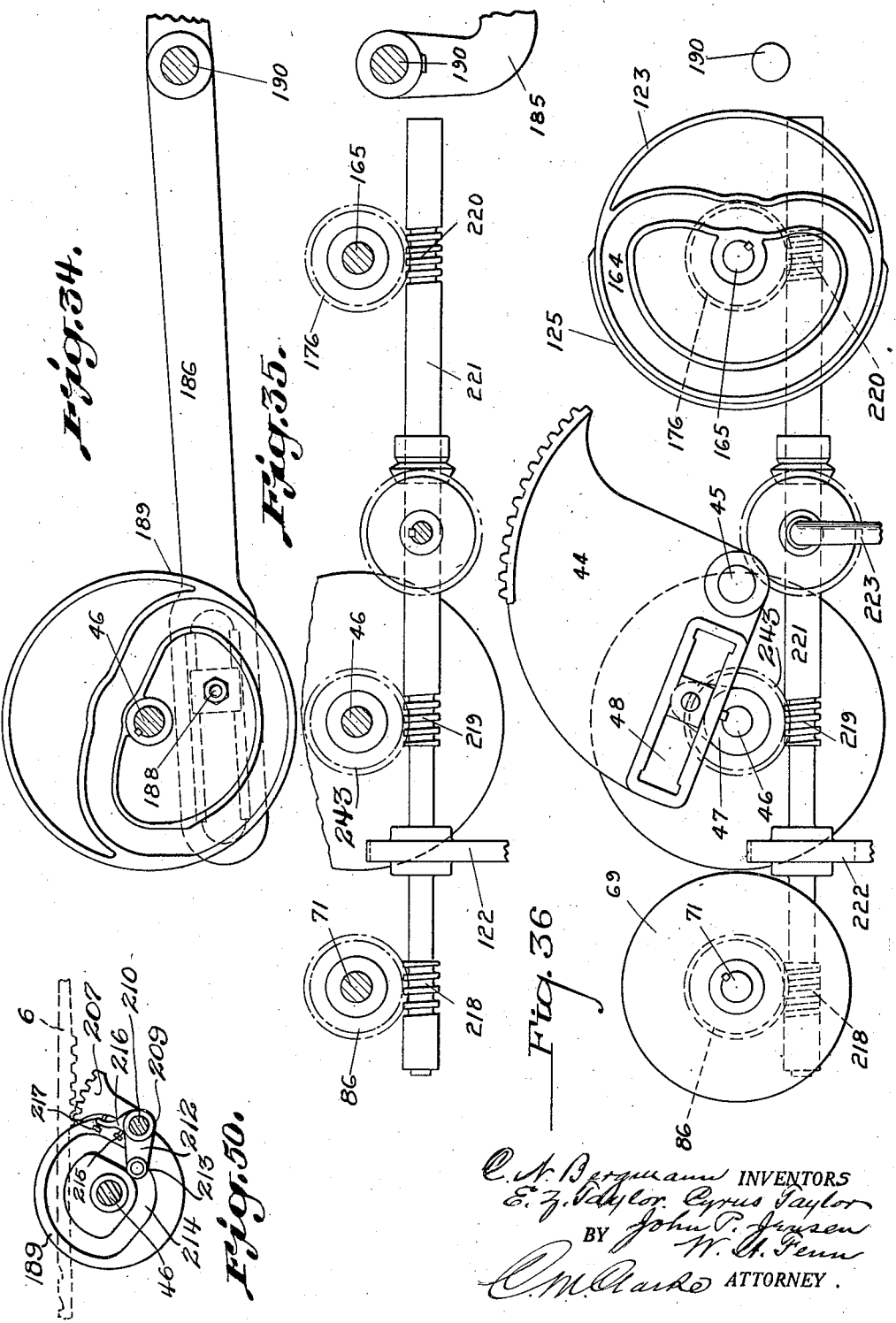

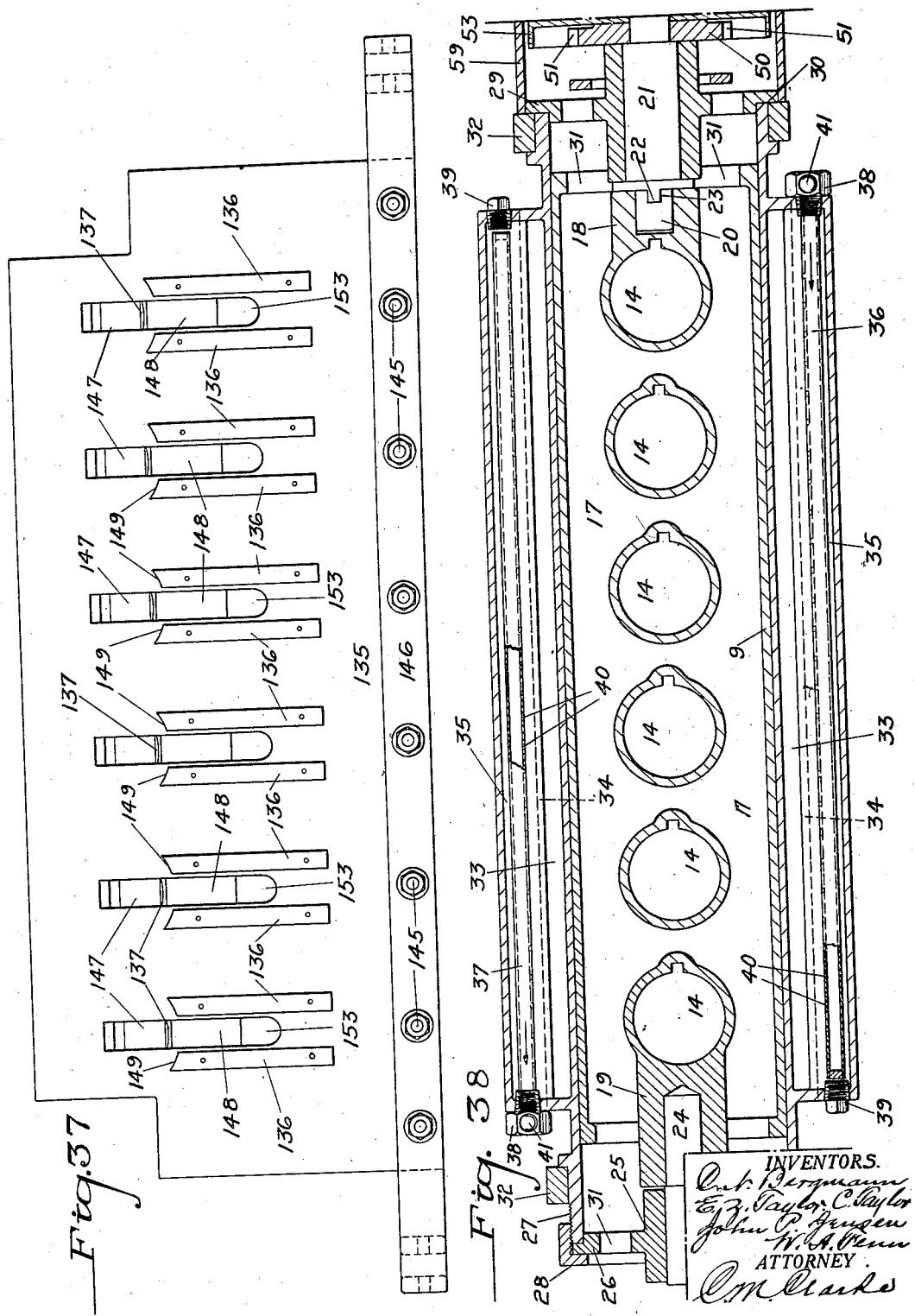

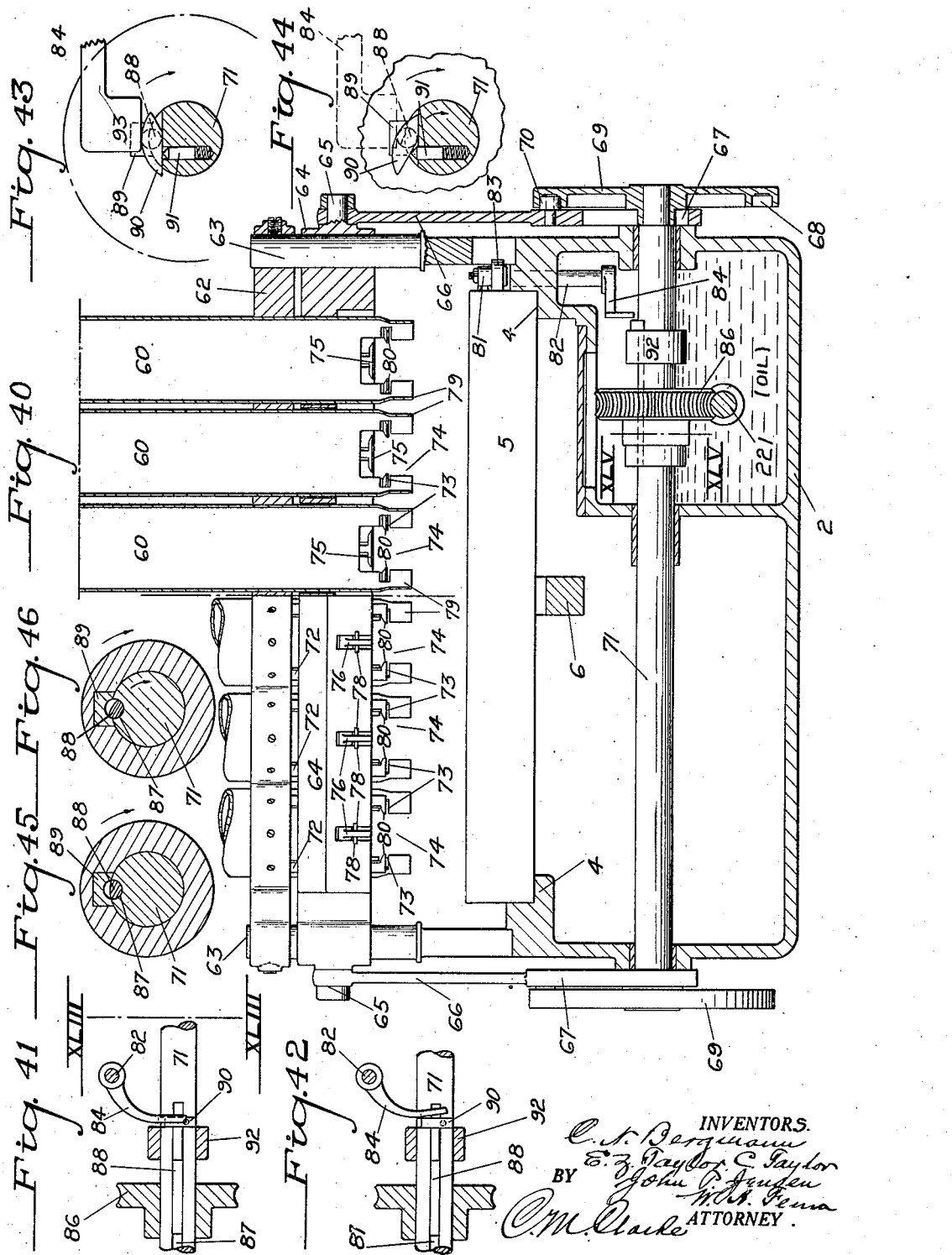

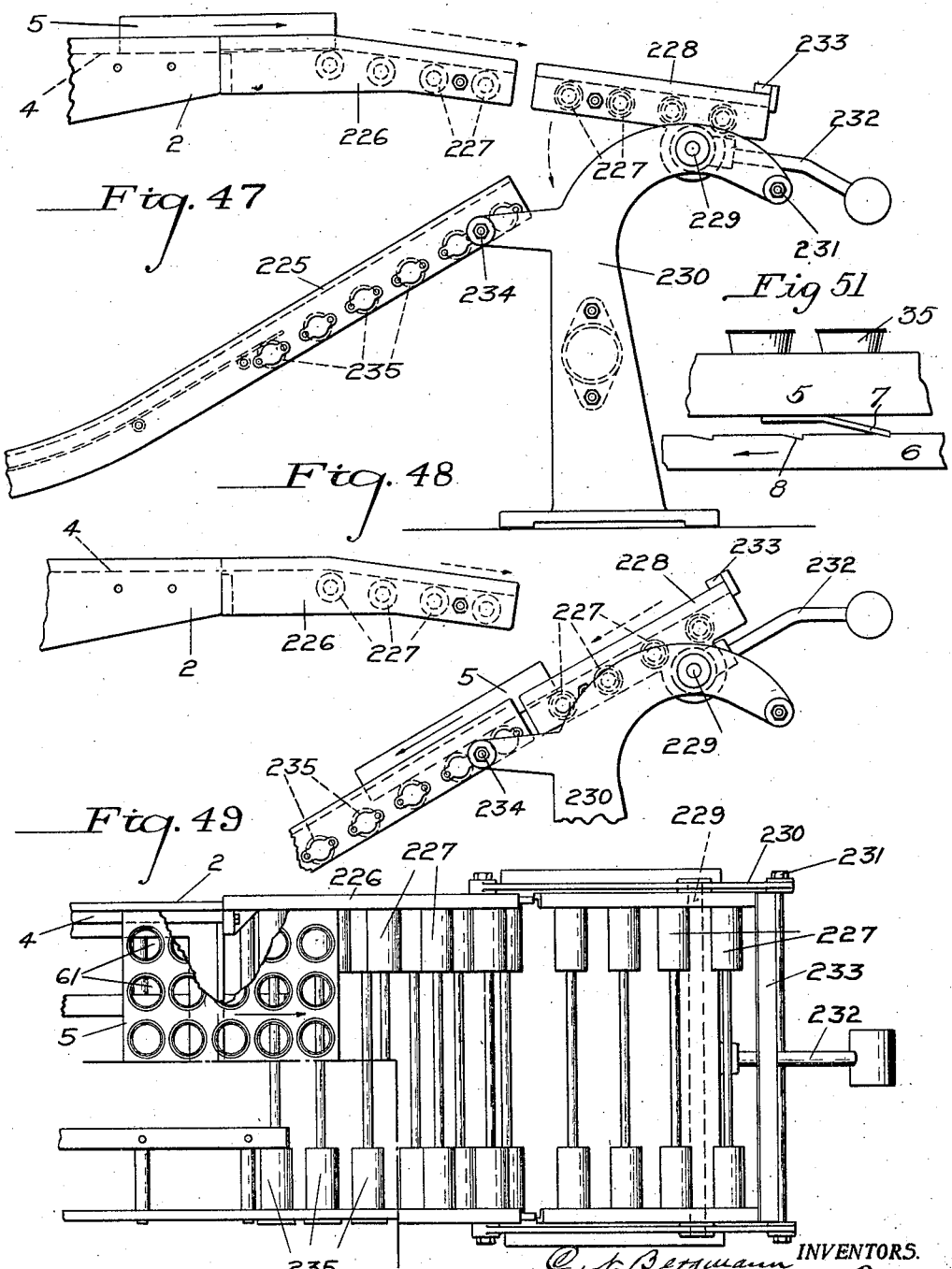

Patented Nov. 5, 1929

1,734,107

UNITED STATES PATENT OFFICE

CHRISTIAN N. BERGMANN, OF PITTSBURGH, PENNSYLVANIA; ELMER Z. TAYLOR, OF NEWARK, NEW JERSEY; AND CYRUS TAYLOR, JOHN P. JENSEN, AND WILSON A. FENN, OF HARTFORD, CONNECTICUT, ASSIGNORS TO BERGMANN PACKAGING MACHINE COMPANY, OF PITTSBURGH, PENNSYLVANIA, A CORPORATION OF DELAWARE

UNIT-MEASURING MACHINE

Application filed April 4, 1925. Serial No. 20,696.

Our invention refers to improvements in machines for measuring units of mobile material, as ice cream, and in separating such measured units from a mass and depositing them separately into containers.

The present invention is an improvement in that class of similar apparatus disclosed in the co-pending application of C. N. Bergmann, filed December 14, 1923, Serial No. 680,633. The features of improvement involved in the present application relate to an improved hopper construction, cup placing mechanism, filling mechanism, capping mechanism, means for ejecting filled receptacles from the tray, means for returning empty trays, driving mechanism, etc.

Generally stated, the machine is designed for the purpose and adapted to deposit unitary amounts of ice cream or other suitable or similar material into cups, receptacles, or containers for the purpose of vending or storing the same in package form in a simple, economical and efficient and expeditious manner.

The invention has in view to use a continuous series of carrying trays arranged to hold the containers, and to successively present them in proper position to be filled and sealed; a supporting trackway therefor, and means for advancing the tray and containers successively through the machine for filling, closing, and finally ejecting the filled packages from the containers, into receiving or holding bags therefor. Also, means for automatically returning empty trays from the delivery end to the receiving end of the machine, together with various other features of construction and operation, as hereinafter more fully described.

In the drawings, illustrating one preferred embodiment of the invention:

Fig. 2 is a plan view of the machine partly broken away;

Fig. 3 is a cross section on the line III—III of Fig. 2;

Fig. 4 is a cross section on the line IV—IV of Fig. 2;

Fig. 5 is a general plan view showing in diagrammatic arrangement the interconnected and co-acting driving mechanism;

Fig. 6 is an enlarged cross section through one of the unitary measuring chambers on the line VI—VI of Fig. 3;

Fig. 7 is a partial plan view, partly broken away, showing discharging mechanism for the filled receptacles in operative relation to the receptacle cavities;

Fig. 8 is a sectional detail view, showing a filled receptacle as discharged from the tray;

Fig. 9 is a view in side elevation of the actuating mechanism for such discharge;

Fig. 10 is a longitudinal sectional view on the line X—X of Fig. 2, showing the discharging plunger lowered and the receptacle holder;

Fig. 11 is a similar view, showing the plunger raised;

Fig. 12 is a partial view similar to Fig. 9, showing the action of the automatic release of said mechanism in case of interference;

Fig. 13 is an enlarged sectional view on the line XIII—XIII of Fig. 12;

Fig. 14 is a detail plan view of the receptacle reservoir;

Fig. 15 is a vertical sectional view reduced on the line XV—XV of Fig. 14, at the commencement of the downward movement of the receptacle detacher;

Fig. 16 is a similar view, showing a further advanced stage of said mechanism;

Fig. 17 is a similar view, showing release of the lowermost receptacle with retention of the remaining receptacles;

Fig. 18 is a detail view of a brake mechanism for the actuating cam for the cover shifting mechanism;

Figs. 19–23 inclusive are detail views in elevation and plan respectively, showing the chambered reservoir;

Fig. 24 is a detail view in elevation of the cover shifting and applying mechanism;

Fig. 25 is a cross sectional view thereof on the line XXV—XXV of Fig. 24;

Fig. 26 is a longitudinal sectional view of the cover shifting mechanism retracted;

Fig. 27 is a similar view, showing the cover in advanced position;

Fig. 28 is a cross sectional detail view on the line XXVIII—XXVIII of Fig. 27;

Fig. 29 is a view in elevation, partly in section, of the transverse cross-head and its suction controlled cover applying mechanism;

Fig. 30 is a view similar to Fig. 26, showing a modified construction of the cover shifting mechanism;

Fig. 31 shows said mechanism in advanced position, with the cover located beneath one of the suction controlled heads;

Fig. 32 is a cross section on the line XXXII—XXXII of Fig. 31;

Fig. 33 is a plan view of a portion of the cover guiding support;

Fig. 34 is a detail view, showing the inner face of the rack bar actuating cam and its outer crank connection with the lever of the receptacle discharging mechanism;

Fig. 35 is a sectional detail view showing the driving connections between the main power shaft and the several distributing shafts;

Fig. 36 is a similar view in elevation;

Fig. 37 is a plan view of the transverse cover shifting plate;

Fig. 38 is a horizontal section on the line XXXVIII—XXXVIII of Fig. 3.

Figure 1:
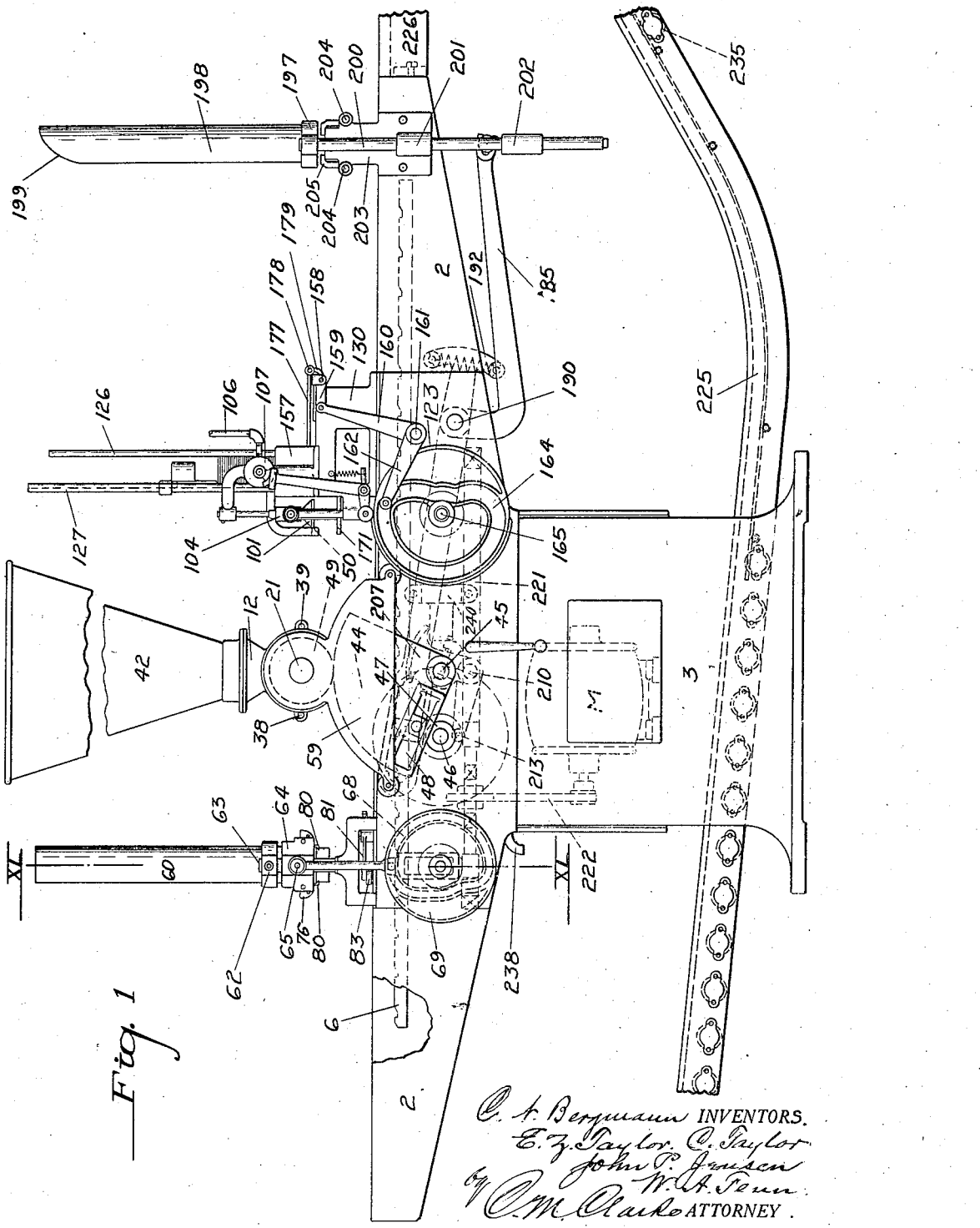
Fig. 1 is a view of the machine in side elevation.
Figure 19:
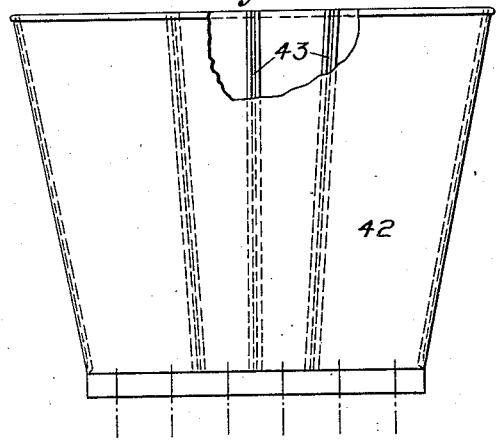
Figure 20:
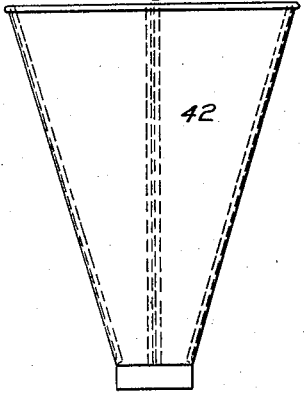
Figure 21:
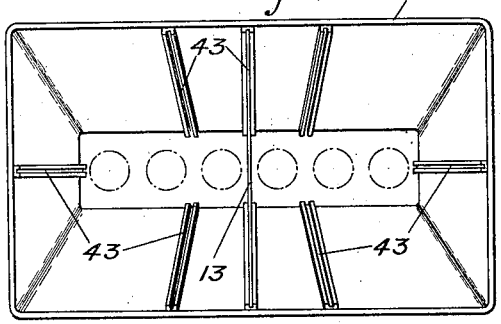
Figure 23:
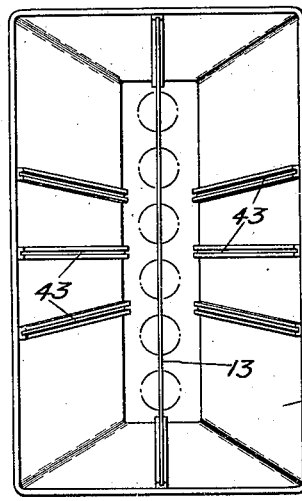
Figure 22:
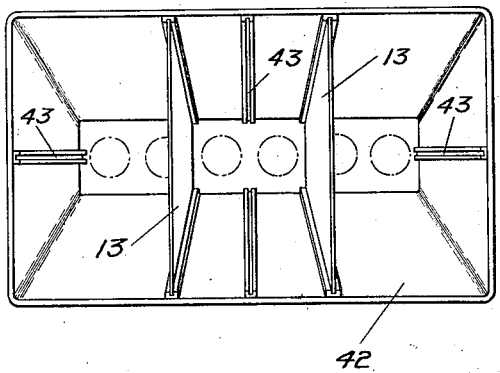

Fig. 39 is a sectional detail view, showing the operation of applying the closing cover to the cup, with the stripper plate in lowered position;

Fig. 40 is a vertical cross section on the line XL—XL of Fig. 1;

Fig. 41 is a detail plan view, showing the interlocked controlling lever for the drive shaft in position for effecting disconnection;

Fig. 42 is a similar view, showing the lever retracted to effect driving connection;

Fig. 43 is an enlarged cross sectional view on the line XLIII—XLIII of Fig. 41;

Fig. 44 is a similar view, showing the effect when the lever is retracted as in Fig. 42;

Fig. 45 is an enlarged cross section on the line XLV—XLV of Fig. 40, showing the position of the locking key for free rotation of the driving gear;

Fig. 46 is a similar view, showing the parts in driving connection;

Fig. 47 is a view in side elevation, detached, of the automatic tray return mechanism at the reversing end;

Fig. 48 is a similar partial view, showing the operation;

Fig. 49 is a plan view of Fig. 47;

Fig. 50 is a detail view showing the cam actuated rack feed for the shifting bar;

Fig. 51 is a detail view showing the shifting mechanism for the cup carrier or tray.

Referring to the drawings, illustrating the invention, the machine as a whole is generally rectangular in form, having an extended horizontal frame 2 at each end of and beyond a main supporting pedestal 3. Extending throughout the length of the frame from one end to the other, and along each inner side, are suitable trackways 4, of flange or angle form as shown, for sliding support of the cup or receptacle carrying frame or tray 5. Said tray is adapted to be advanced intermittently along such trackway by the reciprocable bar 6 and engagement thereby of a pawl 7 depending from the under side of the tray, as in my prior Patent No. 1,659,802.

Said pawl may be made of spring steel, and is adapted to be successively engaged by one of a series of shoulders 8 of bar 6, at the proper time to push the cup carrier or tray forward one space. The shoulders 8 are equally spaced, so as to ensure accuracy in the periodical intermittent movement of the carrier, or a series of them, by the regularity of motion imparted by bar 6.

The cup carrier or tray 5, as therein shown is provided with suitable receiving cavities extending crosswise in rows, spaced apart longitudinally of the holder a distance equalling each forward intermittent movement, whereby to bring each successive transverse row of receptacles underneath the unit measuring mechanism.

The latter, which is of the same general construction and operation as that shown and described in the said patent, comprises a rotary barrel or cylinder 9 mounted within a cylindrical casing 10 below the delivery cavity portion 11 of a main hopper 12. The hopper 12 is transversely or longitudinally divided by partitions 13, as hereinafter described, whereby to separate contents of different flavor, etc., and to direct the contents of the hopper into each transverse unit forming cavity 14 of barrel 9.

Within said barrel and in each cavity 14 thereof, is a slidably mounted reciprocable valve or plunger bottom 15. As shown, there are a series of such cavities and plungers, transversely of the machine and lengthwise of the barrel, each operating independently of the other, but together in discharging corresponding series of formed units into the several receptacles a of tray 5. Each plunger or bottom 15 is capable of alternating gravitating movement across the middle width of its cavity at each half rotation of the barrel, and is limited against further gravitating movement by a suitable abutment, as an inwardly projecting narrow annular lip or lug 16 of casing 10. Also, of extracting and retaining sufficient ice cream composing the next succeeding measured unit thereabove, ready to be sheared off from the main supply mass, upon the next half rotation of the barrel 9.

As shown, the bottoms 15 are of comparatively large size, occupying about one-half of the length of each transverse cavity 14, more or less, according to conditions. The main condition controlling the relative size of the plungers and cavities is that the plungers shall have sufficient weight to positively effect the suction and discharge operation on the ice cream units, by gravitation. In the construction shown, it will be observed that plunger 15 is laterally reduced between its full diameter bearing ends, thus reducing frictional area and providing a vacuum-creating suction by an intervening contained surrounding fluid, as melted cream. The slidable plungers are maintained in alinement by suitable spline devices, to maintain them in proper alinement, their ends being curved conformably to the contour or circumference of the rotatable barrel 9 in which they are mounted. Their operation is clearly described in the above mentioned applications.

Cylinder 9 is mounted in its casing 10 in such a manner as to be easily inserted and withdrawn therethrough and at the same time concentrically mounted and rotated, without friction, due to a small intervening film of cream. For such purpose, it is provided with centrally arranged terminal hubs 18, 19, respectively, hub 18 having a centrally bored cavity for engagement with the stud 20 of driving shaft 21. Said shaft also has a pair of oppositely located keys 22 adapted to register with corresponding sockets 23 of hub 18, so that when barrel 9 is inserted from the opposite end, it must necessarily register properly dependent upon the proper positioning of shaft 21, so as to ensure vertical positioning and registering location of the several cavities 14.

At its other end, hub 19 of barrel 9 is provided with an extended stud 24, secured to the hub and extending into the central hub bearing 25 of supporting ring 26. Said ring is secured upon the outer end 27 of casing 10 by a flanged extension of the ring, which in turn is engaged by the ring nut 28 screwed upon the threaded terminal 27, as shown.

By unscrewing ring nut 28 and removing the supporting ring 26, the barrel may be drawn outwardly for cleaning or repair, care being taken to avoid dropping the several plungers as the barrel is withdrawn.

At its other end, shaft 21 is rotatably mounted in a similar supporting ring 29, secured on the end of casing 10, as shown at 30. Rings 26 and 29 are each preferably provided with air circulation openings 31 providing for free circulation of warm air currents through the entire length of the barrel when desired. For such purpose, the barrel is cored out as at 17. The purpose and advantage of such currents is to maintain the temperature of the working parts at a degree sufficiently high to be always warmer than the ice cream itself. By so keeping the temperature of the machine higher, we prevent any tendency of the ice cream to stick or freeze to the working parts, thereby avoiding any binding or tendency to clog the machine. The opposite ends of casing 10, as shown, are mounted in the upper portions of brackets 32, of each side frame of the machine.

For the purpose of providing additional temperature control, casing 10 is annularly cored around its lower portion and between the plunger cavity positions of the barrel 9 by continuous circulation passages 33 within enclosing walls 34. Said passages communicate at each side of the casing with similar longitudinal passages 35 at opposite sides, through which extend a fluid supply pipe 36 and exhaust pipe 37 respectively. Said pipes are closed at the ends by suitable fittings 38, 39, in the end walls, and are perforated along their inner sides as at 40. The alternate fittings 38, 38, are provided with supply and exhaust pipe connections respectively, at 41, so that by proper valves, a heating fluid as water may be introduced at one side and carried away at the other. By such construction, heated water may be sprayed inwardly for the full or any desired portion of the length of one pipe 36, the water passing downwardly and around passage 33 and then outwardly through pipe 37 at the other side.

For the purpose of providing ample capacity above the immediate hopper cavity 12, a supplemental hopper 42 is suitably fitted thereon and extends upwardly above, as in Fig. 3, of any desired dimensions. In Figs. 19 to 23 inclusive, we show various arrangements whereby one or more partitions 13 may be inserted either longitudinally or transversely, by holding grooves 43 extending along the opposite walls. These may be set as desired to divide the contents as to flavor, etc., either for distribution to one or more of the plunger cavities, as in Figs. 21 and 22, or equally to said cavities for delivery of a double flavor content, as in Fig. 23.

Barrel 9 is intermittently actuated by the power of a driving motor M through the carrier controlled mechanism similar to that disclosed in prior application Serial No. 680,633 referred to. A reciprocable toothed segment 44 is journalled on the end of a bearing stub shaft 45 mounted in the main frame, as in Figs. 1 and 3, and is continuously actuated alternately from cross shaft 46 through crank 47 having sliding connection through slot 48 of the segment.

The teeth of segment 44 are in intermeshing engagement with the teeth of gear 49 so proportioned as to receive a one-half rotation in alternating reverse directions, for each reciprocation of segment gear 44. It is designed that such alternating rotation of gear 49 shall impart a series of successive half rotations to barrel 9, all in the same direction, with an intervening rest period on reverse movement of segment 44. Such rest period is incident to filling, formation, and discharge of the unitary measured sections to be delivered to the receptacles a.

To effect such purpose, shaft 21 is provided with a ratchet wheel 50 having a ratchet shoulder 51 at each opposite side, adapted to be engaged by spring pressed pawl 52 of flanged wheel 53. Gear wheel 49 and wheel 53 are fixedly connected by pins or other means so as to operate together, or may be integral, and both are freely rotatable together upon the hub of wheel 50. Ratchet wheel 50 is keyed to the extension of shaft 21. As thus constructed, alternating rotation of wheel 53 will effect pushing engagement of pawl 52 with one of the opposite shoulders 51 and a resulting half rotation of barrel 9, for each alternate oscillation of wheel 53, which then rotates freely and idly in the reverse direction for similar engagement with the other shoulder 51.

In such movement, pawl 52 engages shoulder 51 at the bottom, moving it around to the top through one complete half rotation corresponding to the active period and reversing to the original bottom position on reverse idle movement of segment 44 during the rest period.

Said mechanism is rendered inoperative in the absence of the tray 5, and operative when the tray and receptacles are present by the pawl controlling mechanism of application No. 680,633. This consists of the arm 54 on rock shaft 55 having the lever arm 56 provided with the terminal roller 57 located in the path of tray 5. Arm 54 is provided with a middle clearance opening for the hub of disk 29 and has at one side the curved cam or fender extension 58.

When the machine is empty, gravitation of arm 56 and its roller throw the fender 58 downwardly into the path of pawl 52, throwing it out of operative range of ratchet shoulders 51. Upon a tray entering, it will ride under roller 57, thrusting it upwardly, and raising fender 58 out of the path of the pawl, so that it will then engage one of said shoulders, effecting a half rotation of wheel 53 and cylinder 9. Each such movement is effected during one complete rotation of the working portion of shaft 46. By this means, the mechanism is inoperative to effect rotation of the unit measuring means until the tray has entered the machine, bringing the first row of receptacles $a$ underneath the several transverse unit measuring positions. During the presence of the tray, or a continuous series of trays in passing through the machine, the roller and arm will be maintained raised and the feeding operation will continue until the last tray has passed beyond the roller, when the roller and arm will drop, rendering the device ineffective.

A protecting shield or coping 59 surrounds the above described gearing, having provision for removal when desired.

Cup depositor

Prior to being advanced to the filling station, where the receptacles $a$ are filled as above described, the trays are passed underneath the transverse series of magazine tubes 60, where each transverse series of spaced cavities 61 of tray 5 is brought to registering position underneath, for depositing therein of the receptacles during the rest period occurring upon reverse movement of bar 6. The construction and operation of said cup depositing mechanism is generally similar to that disclosed in prior application Serial No. 665,604.

The tubes 60 extend upwardly above a stationary supporting crossbar or arm 62 carried at each end on a bracket stem 63 secured to the main frame at each side, with lower clearance for the tray. Tubes 60 are preferably of light metal, and preferably slotted for observation and accessibility to the interior. The cups $a$, as shown, are tapered to fit the tray sockets 61 and are each preferably provided with a terminal shoulder $b$ around their upper edges. Below the crossbar 62 is a reciprocable crosshead 64 having embracing clearance around the lower ends of tubes 60 and connected at each outer end, as at 65, with pitmen 66. These extend downwardly, with a guiding link 67 engaging the hub of the cam and also engaging the cam grooves 68 of cams 69 by intervening rollers 70. Cams 69 are secured to the outer ends of transverse shaft 71 mounted in suitable bearings of the main frame, and driven in synchronism with filling shaft 46, capping shaft 165, and the tray moving shaft 210, as hereinafter described.

Crosshead 64 is intermittently lowered, by cams 69, during the rest period of the tray, and is then raised for the next operation, to deposit the lowermost one of the several series of nested cups $a$ in the sockets 61. Each magazine tube 60 is provided at its lower end with means for supporting the series of nested receptacles, and for successively releasing and positively ejecting the lowermost one of such series for depositing it into the tray cavity, the remaining receptacles falling by gravity within the magazine a distance equalling the overlap of such ejected cup.

Said mechanism is actuated by vertical reciprocation of crosshead 64 and its attached parts, in combination with the retaining and supporting mechanism forming a part of the magazine tubes.

The lowermost cup of each series is normally engaged by a plurality of abutments 80 resiliently mounted by springs 72 depending from cross arm 62 and extending inwardly through clearance openings 73 of the tube underenath the rim of the lowermost cup, as in Fig. 15. The abutments 80 are preferably tapered at their upper faces, so that when the lowermost cup is pressed down, the abutments 80 will spring outwardly as in Fig. 16, and will then spring inwardly underneath the next adjacent cup rim, as in Fig. 17. We have shown four such resilient abutments, equally spaced around the tube, but the number may be varied if desired.

At opposite sides, the tube is cut out as at 74 for clearance of the inwardly extending ejecting fingers or blades 75 at the lower portion of a counter-weighted arm 76 pivoted by pin or rod 77 in the lower enlarged portion of crosshead 64. Fingers 75 taper similarly to abutments 80, and have a widened bearing edge curved to the contour of the cups for good bearing engagement.

Arms 76 are provided with limiting lugs or pins 78 adapted to arrest gravitating movement of the fingers 75 inwardly beyond the necessary distance.

In operation, each downward movement of crosshead 64 from its uppermost position with the fingers engaging above the rim of the lowermost cup, will force said cup down beyond abutments 80, which then spring inwardly to engage the next adjacent rim. The lowermost cup will then fall freely into the tray socket 61.

As shown, the inner diameter of the tube 60 is sufficiently larger than that of the cup rims to provide ample free clearance and avoid any binding or friction. Below the abutments 80, the tubes are slightly constricted, as at 79, more closely approximating the outside diameter of the rims with sufficient clearance for free discharge. By this means, the ejected cup is more accurately centralized for accurate depositing in the tray.

Below each ejecting finger 75, the tube is recessed, as stated, for clearance and access to the interior, as at 74.

As in the filling mechanism, it is also designed that the cup depositor shall be operative or inoperative, dependent on the presence or absence of the tray 5. For such purpose, I utilize a lever 81 for actuating a vertical rock shaft 82 by engagement against the side of the tray by terminal roller 83. When the tray, or a series of them, are passing through the machine, the rock shaft is rotated and its lower terminal lever 84 is thrust away from contact with the unlocking mechanism for the driving gearing against the tension of a reacting spring 85, which normally holds the roller 83 in the path of the tray. Journaled around shaft 71, is the constantly running worm wheel 86, adapted to be interlocked with the shaft for rotating the cams when the tray is present, and to be unlocked to arrest cam rotation as soon as the tray has released roller 83, allowing spring 85 to react, with resulting disconnection of the locking mechanism.

Shaft 71 is provided with a semi-cylindrical keyway 87 in which is rotatably mounted a round key 88, the portion of which extending into the hub of worm wheel 86 is cut off, as in Figs. 45 and 46, to coincide with the circumference of the shaft in one position, and to be tilted up in interlocking position when partly rotated. A bearing block 89 of hardened metal is inserted in the hub to ensure against wear and to engage the tilted-up side of the locking key for rotation, as in Fig. 46. The other end of key 88 is provided with a controlling head 90, as in Figs. 41 and 42, extending across a flattened recess in the shaft 71. A spring actuated pin 91, seated in a recess in the shaft at one side of its center, tends to thrust the head 90 upwardly to rotate key 88 to locking position with the worm wheel, when the head is free. A collar 92 surrounds the shaft 71 and provides a rotatable bearing for the stem of key 88.

Secured to the lower end of vertical rock shaft 82 is a lever 84 having a bearing foot piece 93 adapted to be thrown into the range of head 90 when the tray has passed beyond roller 83, and to be thrust by the rock shaft outwardly from registering engagement with the head 90 when the tray is present, as in Fig. 42. When foot 93 is in registering position with head 90, rotation of shaft 71 causes a wiping action against the foot piece, with the result that stem 88 is rotated to unlocking position, as in Fig. 43, whereupon, the worm wheel 86 will revolve around the shaft without imparting movement to it. When, however, due to the presence of the tray, rock shaft 82 is rotated to throw lever 84 outwardly from register, as in Fig. 42, spring pressed pin 91 effects rotation of stem 88 to thrust it into locking engagement with the worm wheel, whereupon shaft 71 could be rotated. Its operation will continue in imparting movement through cams 69 to the cup depositor mechanism in the manner described until rock shaft 82 is again rotated by reaction of lever 81.

*Capper*

After the cups have been delivered to the trays and filled by the mechanism above described, the trays with the filled cups then proceed through the machine to the capping station, where the cups are closed by the covers, and we shall now describe that portion of the machine and its operation.

In general, the operation is similar to that disclosed in prior applications of Bergmann Serial No. 613,595 and No. 691,426. The present construction involves improved mechanism for detaching the lowermost cap or caps from one or more superimposed banks, shifting the cap to operative position with relation to a suction plunger, actuating the plunger to insert the cap in the filled receptacle, means for actuating such mechanism in synchronism and proper timing with relation to the other parts of the machine, and various other features of construction, as shall be described.

The filled receptacles or cups *a* are intermittently advanced beyond the filling station to the capping station, where they are closed by thin paper caps, during the rest period, by the several reciprocable suction plungers 101. These are mounted by their hollow stems 102 upwardly in bearing lugs 103 of the lower wall of a hollow crosshead 104, which is slidably mounted at each end on the vertical guide posts 105 extending upwardly from the main frame. As shown in Fig. 31, the bearings 103 extend clear across the lower portion of the hollow interior of the crosshead 104, providing intervening pockets for the collection of any ice cream which might be sucked up through the plungers.

Hollow crosshead 104 is in suction connection with a vacuum pump or other suitable air exhauster (not shown) by pipe 106 through a controlling valve in casing 107 mounted in the position shown. The valve is in suction communication with the interior of crosshead 104 by telescoping pipes 109—110 and conduit 111, so that suction is maintained with the crosshead at varying positions, as controlled by the valve.

The interior of the crosshead is continuously open as in Fig. 29, interrupted by downwardly extending baffle walls 112 adapted to deflect any ice cream that may be sucked up by either plunger and cause it to fall to the bottom. The interior of the crosshead may be washed out from time to time by connecting a hose supply to conduit 111 at 113, an exhaust opening and plug being provided at any suitable point in the lower portion of the crosshead.

A rotatable valve 114 in casing 107 has a port 115 adapted to open suction communication with pipe 106 by rotation of its stem 116 through toothed segment 117 and rack 118 of cam controlled arm 119. Said arm is pivoted at 120 and has a bell crank lever arm 121 and roller 122 held against the periphery of cam 123 by spring 124. Said cam is generally circular, but is enlarged for a portion of its periphery by extended rim 125.

It is designed that for a portion of the rotation of cam 123 suction shall be maintained on the plungers through open port 115, as in Fig. 24, but closed for the remaining portion, during contact of cam face 125 with roller 122. This is accomplished by partial rotation of valve 114 and closing of the port leading to suction pipe 106 through the mechanism described.

The several caps *c* for closing of the filled cups are mounted in a series of banks transversely of the machine, each bank being in longitudinal alinement with the particular filled and cup distributing center line lengthwise of the machine.

The caps *c* are maintained in proper vertical position and alinement by groups of three guide rods 126, 126, and 127, spaced around each circular cap-receiving space 128 of a cross-supporting bridge member 129. Said bridge member is fixedly mounted across the machine at the capping station by terminal legs 157 secured by bolts 158 to the top of shifter plate frame 130. Said frame 130 is fixedly secured to the main side frame of the machine, and extends forwardly underneath the bridge member with supporting brackets 140 for cover selecting and placing mechanism.

Each circular opening 128 of said member is open at the rear, as at 131, for access to the interior, and the guide stems 126 are at each side thereof. As shown, these stems are of round rods, mounted in partly open sockets 132 by set screws 133, so that their inner edges project slightly beyond the inner circular wall of opening 128. The third guide rod 127 is similarly secured and is located centrally midway of the rods 126, and has an inwardly disposed longitudinal groove 134 for guiding clearance of the cover tangs.

The rods 126 and 127 extend downwardly to a level just sufficiently above the shifting plate 135 to leave enough clearance for one of the thin paper covers *c* to be shifted by the thin pushing blades 136 of the plate and the middle pushing dogs 141.

Plate 135 extends clear across underneath the several banks of covers and is slidably mounted on the upper surface 138 of the transverse base 130 which supports the bridge member 129, and which extends forwardly therefrom to the edge of the bridge. At intervals corresponding to the transverse spacing of the several bank centers are the brackets 140 between which ride the pushing dogs 141 by flanges 142.

As shown in Figs. 26, 27 and 28, the dogs 141 are held upwardly with their flanges 142 against an inclined trackway 156 of brackets 140 by spring action of links 144, which connect the dogs by bolt 145 with the cross bar 146 by which plate 135 is shifted.

Plate 135 is provided with a pair of abutments 157 corresponding in location to the pushing terminals of plates 136, but inclined at the rear for free clearance of the lower cover on rearward movement of the plate.

Each dog 141 is provided with upper faces 147 and 148 sloping upwardly towards the middle where a transverse inserted tooth 137 of hard metal is mounted, adapted to engage against the rear middle edge of the lowermost cap *c*. Tooth 137 is curved to the radius of the covers, and is located in co-acting relation to the similarly curved pushing edges 149 of thin side plates 136, as in Fig. 37.

When the dogs 141 are shifted forwardly from the position of Fig. 26, tooth 137 engages the lowermost cover *c* and slides it forwardly, the thin strips 136 moving with plate 135 at each side, underneath the bank of covers c and supporting them above the plate.

Outwardly beyond bridge 129 is a cross-bar 150 supported by brackets 151 thereon and recessed at 152 for clearance of the cover tang and the front edge of the cover. As dog 141 rides forwardly and downwardly through clearance opening 153 of plate 135, tooth 137 falls below the edge of the cover, which is pushed out for the short remainder of the stroke by plates 136. At the ends of the stroke, plate 135 is outwardly underneath cross-bar 150, as in Fig. 31, and the cover is in proper position underneath suction plunger 101. At such time, valve 114 is open and the cover will be held up by suction against the plunger face. Thereupon, plate 135 is retracted and the plunger is lowered with the cover into the cup a, by cross-head 104, as in Fig. 39.

The dogs 141 being connected with the sliding plate by the flexible links 144 having hook terminal 154 engaging the cross pin 155, may be easily removed by unhooking and withdrawal from groove 143.

In Figs. 30, 31 and 32, we show a modified construction in which the flanges 142 of dogs 141 slide in inclined grooves 143 on the opposite inner sides of each pair of brackets 140. Said dogs are connected by spring link 144 and bolt 145 with the cross bar 146 of shifting plate 135.

In operation, the dog 141 rides backwardly underneath the bank, lifting the covers slightly, as in Fig. 30, until tooth 137 engages the edge of the lower cover. Reverse movement of the plate pushes the lower cover forwardly under the lower end of post 127, which retains the remaining covers, the operation being continued for each cover placement.

The plate 135 is shifted by its cross-bar 146 through end lugs thereof, to which is pivotally connected at 158 the link 159 of lever 160. Said lever is pivoted at 161 and has an arm 162 provided with a terminal roller 163 riding in groove 164 of cam 123. It will be understood that the same construction is provided at each side, cams 123 being secured to the opposite ends of the continuously running drive shaft 165, as in Fig. 4. Cam face 125, however, is on but one of the said cams, for control of the suction valve 114.

After the covers have been shifted as described, and are in suction contact with the plungers 101, these are lowered by their crosshead 104 on guide stems 105 by pitmen 166 engaging terminal studs 167.

Cams 123, right and left, have cam grooves 168 on their inner sides engaging rollers 169 of pitmen 166, and the pitmen are each provided with a guiding link extension 170 slidably embracing the shaft 165.

For the purpose of positively arresting the cup a upon upward movement of the plungers 101 after the cap c is placed, a stripper plate or bar 171 is suspended below crosshead 104 by stems 172 slidably mounted in bearings therein, with intervening springs 173 and terminal limiting collars 174.

A clearance opening is provided through the stripper plate for each plunger, outwardly flaring above and below an intermediate annular shoulder or abutment 175. As the plungers are lowered, the stripper plate is lowered in advance until shoulder 175 engages the top edge of the cup, the plunger then passing through the opening and applying the cap, as in Fig. 39.

Upon withdrawal, the stripper plate continues to retain the capped cup until spring 173 is extended and stems 172 are arrested and lifted by their terminal abutments 174. The tray 5 is then shifted forward one additional space, and the operation is repeated. Shaft 165 is driven by continuously running worm wheel 176 subject to the same tray controlled interlocking mechanism already described in connection with the cup depositor, and as shown in Fig. 4, with corresponding reference numerals.

For the purpose of covering the shifter plate, we provide a thin flat shield or plate 177 hinged at 178 to bearing arms 179 extending from frame 130 at each side. Said plates may be thrown upwardly, as in Fig. 24, for access to the shifter plate and its parts when desired.

*Cup ejector*

After the cups have been filled and capped as described, they are brought into register with the ejecting mechanism, at the delivery end of the machine. This consists of a series of upwardly moving plungers which thrust the filled cups by their bottom edges upwardly from the tray cavities into receiving tubes which guide them into a surrounding wrapper or bag.

The walls of the several cup cavities 61 of tray 5 are provided with vertical clearance slits 180 extending through the bottom for the purpose of allowing the discharge upwardly through the open bottom of a cup of the discharging plunger 181. Said plunger is adapted to fit upwardly within the inset bottom of the cup a and to bear against the lower rim edges by its tapering end and by the several directly abutting lateral fingers 182. In this manner the tapering extension above the fingers ensures centering placement of the plunger within the cup bottom and against its lower rim only. Said fingers 182 engage directly against the edges of the cup, relieving the pressure from the transverse bottom, avoiding any tendency to burst or disrupt the cup, raising it upwardly and outwardly from the tray cavity at the end of the upper stroke of the plunger. Said plunger is mounted at the upper end of stem 183, carried in a crosshead 184, and is operated by levers 185 at each side of the longitudinal center of the machine. Said levers are slidably connected with crosshead 184, as at 94, and are actuated upwardly and downwardly by co-acting lever 186 having slotted connection at 187 with the crank 188 of crank disk 189 of shaft 46. Lever 186 is loosely journaled by its hub on the end of rock shaft 190, to which levers 185 are fixedly secured. A supplemental arm 191 of lever 186 is in flexible driving connection with positively secured arm 192 of shaft 190, whereby to actuate levers 185 normally to the same degree of movement as lever 191, but to allow for automatic release of pressure and continuous operation of lever 186 without imparting movement to rock shaft 190, in the event of any obstruction interfering with upward movement of the plungers.

The object in view is to prevent breakage or disruption, should for any reason the tray fail to move into exact registering position with the open bottom of the cup cavity in line with the plunger 181. Such result is effected through the elastic connection between positively moving arm 191 and arm 192, by means of tension springs 193 and 194. Said springs connect the opposite ends of the levers by their pins 195 and 196 respectively, the springs acting to draw the arms together until resisted by contact of the pins against the opposite arms, where the tension of the springs is still sufficiently strong to maintain the levers in erected normally operative position, as in Fig. 9. When, however, plungers 181 fail to pass through the cup carrier and are interrupted, as in Fig. 12, lever 186 may continue its full normal stroke, the springs permitting levers 185 to merely remain inoperative under the varying spring tension.

Extending upwardly above the tray position, at the delivery end, mounted in a transverse crosshead 197, are a series of cup receiving tubes 198 preferably terminating in a sloping open terminal 199. Crosshead 197 is supported at each end in proper position by stems 200 extending downwardly through bearings 201 secured to each side of the main frame, stems 200 being sufficiently long to provide a lower slide bearing for the outer terminals 202 of the plunger crosshead 184. Bearing 201 forms a part of a bracket 203 at each side, in which are mounted the cross rods 204 forming the hinge mounting of the temporary cup supporting arms 205. These, as shown in Figs. 10 and 11, are disposed inwardly to provide grasping terminals adapted to be spread apart by the upwardly moving cup $a$ and to engage its upper rim by gravitating movement inwardly, to support it as shown.

In the operation of the plungers 181, they pass upwardly through the open bottoms of the cup cavities, lifting all of the filled and capped cups of a single transverse row to the supported position on arms 205. Thereafter the next succeeding similar movement pushes the thus supported cups upwardly with similar supporting action of the following cups, which movement is continuous, the cups ascending through tubes 198 in columns of closely adjacent cups. As indicated at 206, a paper bag or similar container is inverted over each tube 198, the tube being preferably slotted. As any partiuclar number of filled cups are pushed upwardly through the individual tubes, as four or eight, depending on the length of the bag 206, they with the enclosing bag are removed upwardly and deposited away from the machine, as in a receptacle to be taken to the refrigerating room. In this respect, the invention performs the function of filling the packages in conformity with the subject matter of prior application of Bergmann Serial No. 743,939.

*Intermittent tray feed*

The reciprocation of the tray-shifting bar 6 is effected through the alternating movement of an arc-shaped rack 207, engaging corresponding teeth 208 on the under side of bar 6. Segment 207 is mounted by a divided and tightened hub 209 on the end of rock shaft 210, extending inwardly from one side of the machine through bearings 211 and provided with an actuating crank 212 having a terminal roller 213, engaging a cam groove 214 of crank wheel 189. Hub 209 is clamped by means of a connecting bolt or screw 215 so as to accurately locate it on the shaft.

An arm 216 mounted on the inner end of shaft 210 is provided with a terminal bearing having an adjusting screw 217, by means of which the segment arm may be very accurately adjusted so as to exactly effect the desired stroke for proper and timely movement of the shift bar.

The several main drive shafts 71, 46 and 165 are in direct driving engagement by their worm wheels 86, 243, and 176, with the worm teeth 218, 219, and 220, respectively, of drive shaft 221. Said drive shaft is geared by pulley and belt 222 with the driving pulley of motor M, as in Fig. 1.

For the purpose of effecting similar movement to the drive shaft 221, we provide a crank 223 mounted in the side frame of the machine, with proper bearings therefor, and suitable gearing as bevels 224 or other suitable gearing, whereby the shaft and its connected parts may be slowly operated by hand power.

*Tray return*

For the purpose of effecting automatic return of the empty trays 5 from the delivery end of the machine, back to the charging end, a continuous trackway 225 is provided, having an inclined portion extending upwardly to a point below and beyond the end of main frame 2, as in Fig. 47.

A supplemental frame 226 extends outwardly in alinement with the trackway of the main frame 2, with a slight downward inclination at its ends, and is provided with series of bearing rollers 227, rotatably mounted in the side bars of frame 226. Beyond such extension 226 is a similar short section 228, having similar rollers 227, and pivotally mounted by a cross supporting rod 229 in the upper side members of a frame 230. Said frame, which extends upwardly from the main floor, as in Fig. 47, terminates at 231 in a cross connecting and supporting bar, upon which rests the arm 232 of a counter-weighted lever, secured to frame 228 or its rock shaft 229. Frame 228 is adapted to tilt downwardly when charged with a tray passing onwardly by gravity from the inclined terminal of extension 226, and is preferably provided with a terminal buffer 233 of any suitable construction.

Return trackway 225 extends upwardly and is in supporting connection at 234 with an arm of frame 230, to hold it in receiving position with relation to tilting section 228, when said section is tilted downwardly by the weight of the tray against a suitable stop, as in Fig. 48.

Trackway 225 is also provided with rollers 235, over which the tray easily and quickly passes between the upwardly extending sides of the return track, which passes through the middle supporting base frame 3 of the machine, and is inclined slightly upwardly to check the momentum of the moving tray.

The return trackway 225 leads to any convenient point near the front of the machine, where the tray will be delivered, and may be taken off and set upon the entering trackway of the machine within range of the shift bar 6 and against the previously placed tray, so as to move forwardly in continuous direct abutting order, as provided by the shift bar in the manner described.

In the operation of the machine, it is intended that a continuous series of trays abutting each other in order to effect continuous regular spacing of the transverse cavities, shall continuously move through the machine, continuously maintaining the several controlling rollers 83, 57, and 83 extended.

The middle lower portion of the main frame 2, corresponding to the length of bar 3, is floored underneath by a sloping closing wall 236, as in Figs. 3 and 4, terminating in a longitudinal gutter 237 adapted to collect any water or other liquid, and to deliver it outwardly from the machine at any suitable point, as by an outlet pipe 238. This feature of the machine provides for easy washing and removal of waste matter.

In order to check undue momentum of cam 123, or any other similar cam or wheel, we utilize a peripheral brake shoe 239 slidably mounted in a housing 240 secured to the side of the frame, and having a pressure spring 241 with an adjusting set screw 242, as in Fig. 18.

The general construction of the machine and its manner of operation will be readily understood from the foregoing description. It embodies in a self-contained mechanism the several co-acting factors contributing to successive placement of the cups, filling of the cups, capping, discharging, and packing, in a continuous operation in a single machine, without manual manipulation of any kind.

The machine is capable of a large daily output of ice cream in package form, and it will be understood, of course, that the size of the packages or cups, their shape, or various other detail features of construction or operation, may be variously changed or modified by the skilled mechanic within the scope of the following claims.

What we claim is:

1. In a cup filling and capping machine, the combination of a frame having a longitudinal trackway, a cup depositor, a cup filler, and a capper located above the trackway at operating stations, a cup holding tray slidably mounted on the trackway having longitudinally spaced cup receiving cavities and a pawl, and a reciprocable shouldered shift bar engageable with the pawl for intermittently moving the tray along the trackway to locate its cavities successively underneath the cup depositor, the cup filler, and the capper respectively, with correspondingly timed rest periods.

2. In a cup filling and capping machine, the combination of a frame having a longitudinal trackway, a cup depositor, a cup filler, and a capper located above the trackway at operating stations, means for actuating the depositor, filler, and capper simultaneously, a cup holding tray slidably mounted on the trackway having longitudinally spaced cup receiving cavities and a pawl, and a reciprocable shouldered shift bar engageable with the pawl for intermittently moving the tray along the trackway to locate its cavities successively underneath the depositor, filler, and capper respectively, with correspondingly timed rest periods.

3. In a cup filling and capping machine, the combination of a frame having a longitudinal trackway, a cup depositor, a cup filler, and a capper located above the trackway at operating stations, means for actuating the depositor, filler, and capper simultaneously, a cup holding tray slidably mounted on the trackway having longitudinally spaced cup receiving cavities and a pawl, and a reciprocable shouldered shift bar engageable with the pawl geared with said actuating means in synchronous relation for intermittently moving the tray along the trackway to locate its cavities successively underneath the depositor, filler, and capper respectively, with correspondingly timed rest periods.

4. In a cup filling and capping machine, the combination of a frame having a longitudinal trackway, a cup depositor, a cup filler, and a capper located above the trackway at operating stations, means for actuating the depositor, filler, and capper simultaneously, a cup holding tray slidably mounted on the trackway having longitudinally spaced cup receiving cavities, a reciprocable shouldered shift bar for intermittently moving the tray along the trackway to locate its cavities successively underneath the depositor, filler and capper respectively with correspondingly timed rest periods, means for actuating the shift bar, and a prime mover geared with each of said actuating means for synchronous operation thereof.

5. In a cup filling and capping machine, the combination of a frame having a longitudinal trackway, a rotatable cup filler alternating mechanism for partly rotating the cup filler embodying a segmental gear, and a capper, located above the trackway at operating stations, a cup holding tray slidably mounted on the trackway having longitudinally spaced cup receiving cavities and a pawl, and a reciprocable shouldered shift bar engageable with the pawl for intermittently moving the tray along the trackway to locate its cavities successively underneath the cup filler and capper respectively, with corresponding timed rest periods.

6. In a cup filling and capping machine, the combination of a frame having a longitudinal trackway, a cup filler, and a capper, located above the trackway at operating stations, a cup holding tray slidably mounted on the trackway having longitudinally spaced cup receiving cavities and a pawl, a reciprocable shouldered shift bar engageable with the pawl for intermittently moving the tray along the trackway to locate its cavities successively underneath the cup filler and capper respectively, with correspondingly timed rest periods, and means for ejecting filled cups upwardly from the tray.

7. In a cup filling and capping machine, the combination of a frame having a longitudinal trackway, a rotatable cup filler alternating mechanism for partly rotating the cup filler embodying a segmental gear, and a capper, located above the trackway at operating stations, a cup holding tray slidably mounted on the trackway having longitudinally spaced cup receiving cavities and a pawl, a reciprocable shouldered shift bar engageable with the pawl for intermittently moving the tray along the trackway to locate its cavities successively underneath the cup filler and capper respectively, with correspondingly timed rest periods, and means subject to the presence of the tray for effecting operation of the cup filler and capper.

8. In a cup filling and capping machine, the combination of a frame having a longitudinal trackway, a cup depositor, a cup filler, and a capper located above the trackway at operating stations, a cup holding tray slidably mounted on the trackway having longitudinally spaced cup receiving cavities and a pawl, a reciprocable shouldered shift bar engageable with the pawl for intermittently moving the tray along the trackway to locate its cavities successively underneath the depositor, filler, and capper respectively, with correspondingly timed rest periods, and means for ejecting filled cups upwardly from the tray.

9. In a cup filling and capping machine, the combination of a frame having a longitudinal trackway, a cup depositor, a cup filler, and a capper located above the trackway at operating stations, a cup holding tray slidably mounted on the trackway having longitudinally spaced cup receiving cavities, means for intermittently moving the tray along the trackway to locate its cavities successively underneath the depositor, filler, and capper respectively, with correspondingly timed rest periods, and means subject to the presence of the tray for effecting operation of the depositor, filler, and capper.

10. In a cup filling and capping machine, the combination of a frame having a longitudinal trackway, a rotatable cup filler, alternating mechanism for partly rotating the cup filler embodying a segmental gear, and a capper, located above the trackway at operating stations, a cup holding tray slidably mounted on the trackway having longitudinally spaced cup receiving cavities and a pawl, a reciprocable shouldered shift bar engageable with the pawl for intermittently moving the tray, a driving shaft, and means geared therewith for actuating the filler and capper at the same time, and said shift bar.

11. In a cup filling and capping machine, the combination of a frame having a longitudinal trackway, a rotatable cup filler, alternating mechanism for partly rotating the cup filler embodying a segmental gear, and a capper, located above the trackway at operating stations, a cup holding tray slidably mounted on the trackway having longitudinally spaced cup receiving cavities and a pawl, a reciprocable shouldered shift bar engageable with the pawl for intermittently moving the tray, a driving shaft, and means geared therewith for actuating the filler and capper at the same time with alternating operation of the tray moving shift bar.

12. In a cup filling and capping machine, the combination of a frame having a longitudinal trackway, a cup depositor and a cup filler located above the trackway at operating stations, a cup holding tray slidably mounted on the trackway having longitudinally spaced cup receiving cavities and a pawl, a reciprocable shouldered shift bar engageable with the pawl for intermittently moving the tray along the trackway to locate its cavities successively underneath the depositor and filler respectively with correspondingly timed rest periods, a driving shaft, and means geared therewith for actuating the depositor and filler at the same time with alternating movement of the shift bar.

13. In a cup filling and capping machine, the combination of a frame having a longitudinal trackway, a cup depositor and a cup filler located above the trackway at operating stations, a cup holding tray slidably mounted on the trackway having longitudinally spaced cup receiving cavities and a pawl, a reciprocable shouldered shift bar engageable with the pawl for intermittently moving the tray along the trackway to locate its cavities successively underneath the depositor and filler respectively with correspondingly timed rest periods, a driving shaft, and means geared therewith for actuating the depositor and filler at the same time with alternating operation of the tray moving means.

14. In a cup filling and capping machine, the combination of a frame having a longitudinal trackway, a cup depositor and a cup filler located above the trackway at operating stations, a cup holding tray slidably mounted on the trackway having longitudinally spaced cup receiving cavities, means for intermittently moving the tray along the trackway to locate its cavities successively underneath the depositor and filler respectively with correspondingly timed rest periods, and means subject to the presence of the tray for effecting operation of the depositor and filler.

15. In a cup filling and capping machine, the combination of a frame having a longitudinal trackway, a cup depositor, a cup filler, a capper, and a cup ejector located at successively advanced positions corresponding to operating stations longitudinally of the machine, a cup holding tray slidably mounted on the trackway having longitudinally spaced open bottom cup receiving cavities and a pawl a reciprocable shouldered shift bar engageable with the pawl for intermittently moving the tray along the trackway to locate its cavities in register with the depositor, filler, capper and ejector respectively with correspondingly timed rest periods, and means for actuating the depositor, filler, capper, and ejector during such rest periods.

16. In a cup filling and capping machine, the combination of a frame having a longitudinal trackway, a cup depositor, a cup filler, a capper, and a cup ejector located at successively advanced positions corresponding to operating stations longitudinally of the machine, a cup holding tray slidably mounted on the trackway having longitudinally spaced open bottom cup receiving cavities, means for intermittently moving the tray along the trackway to locate its cavities in register with the depositor, filler, capper and ejector respectively with correspondingly timed rest periods, and means for actuating the depositor, filler, and capper subject to the presence of the tray.

17. In a cup filling and capping machine, the combination of a frame having a longitudinal trackway, a cup depositor, a cup filler, a capper, and a cup ejector located at successively advanced positions corresponding to operating stations longitudinally of the machine, a cup holding tray slidably mounted on the trackway having longitudinally spaced open bottom cup receiving cavities and a pawl, a reciprocable shouldered shift bar engageable with the pawl for intermittently moving the tray along the trackway to locate its cavities in register with the depositor, filler, capper and ejector respectively with correspondingly timed rest periods, a driving shaft, and means geared therewith for actuating the depositor, filler, capper and ejector at the same time.

18. In a cup filling and capping machine, the combination of a frame having a longitudinal trackway, a cup depositor, a cup filler, a capper, and a cup ejector located at successively advanced positions corresponding to operating stations longitudinally of the machine, a cup holding tray slidably mounted on the trackway having longitudinally spaced open bottom cup receiving cavities and a pawl, a reciprocable shouldered shift bar engageable with the pawl for intermittently moving the tray along the trackway to locate its cavities in register with the depositor, filler, capper and ejector respectively with correspondingly timed rest periods, a driving shaft, means geared therewith for actuating the tray moving shift bar, and means geared with said shaft for actuating the depositor, filler, capper and ejector during a rest period of the tray moving means.

19. In a cup filling and capping machine having a longitudinal trackway, a cup filler and capper, a cup holding tray slidably mounted on the trackway having longitudinally spaced open bottom cup receiving cavities, and means for intermittently moving the tray into registering positions therewith with alternating rest periods and for actuating the filler and capper during such rest periods, the combination therewith of an upwardly acting ejector for the cups consisting of a shouldered bottom-edge-supporting plunger having a tapered centering extension operating through the open bottom cup cavities.

20. In a cup filling and capping machine having a longitudinal trackway, a cup filler and capper, a cup holding tray slidably mounted on the trackway having longitudinally spaced open bottom cup receiving cavities, and means for intermittently moving the tray into registering positions therewith with alternating rest periods and for actuating the filler and capper during such rest periods, the combination therewith of an upwardly acting ejector for the cups consisting of a shouldered bottom-edge-supporting plunger having a tapered centering extension operating through the open bottom cup cavities during a rest period of the tray and in operative connection with the means for moving the tray.

21. In a cup filling and capping machine having a longitudinal trackway, a cup filler and capper, a cup holding tray slidably mounted on the trackway having longitudinally spaced open bottom cup receiving cavities, and means for intermittently moving the tray into registering positions therewith with alternating rest periods and for actuating the filler and capper during such rest periods, the combination therewith of an upwardly acting ejector for the cups consisting of a shouldered bottom-edge-supporting plunger having a tapered centering extension operating through the open bottom cup cavities during a rest period of the tray and in operative connection with the means for actuating the filler and capper.

22. In a cup filling and capping machine having a longitudinal trackway, a cup filler and capper, a cup holding tray slidably mounted on the trackway having longitudinally spaced open bottom cup receiving cavities, and means for intermittently moving the tray into registering positions therewith with alternating rest periods and for actuating the filler and capper during such rest periods, the combination therewith of an upwardly acting ejector for the cups consisting of a vertically moving shouldered bottom-edge-supporting plunger having a tapered centering extension and a compound lifting lever therefor having a spring-connected joint permitting interference of the plunger.

23. In a cup filling and capping machine having a longitudinal trackway, a cup filler and capper, a cup holding tray slidably mounted on the trackway having longitudinally spaced open bottom cup receiving cavities, and a reciprocable shouldered shift bar for intermittently moving the tray into registering positions therewith with alternating rest periods and for actuating the filler and capper during such rest periods, the combination therewith of an upwardly acting ejector for the cups consisting of a vertically moving shouldered bottom-edge-supporting plunger having a tapered centering extension and a compound lifting lever therefor having a spring-connected joint permitting interference of the plunger, and an operating element for the lever in driving connection with the tray moving means.

24. The combination with a cup filling and capping machine having a longitudinal trackway, a cup filler and capper, a cup holding tray slidably mounted on the trackway having longitudinally spaced open bottom cup receiving cavities, a reciprocable shouldered shift bar for intermittently moving the tray to place its cavities into registering positions with the filler and capper, and means for alternately actuating the shift bar and the filler and capper; of a receiving tube for filled cups extending upwardly above the trackway, and a vertically movable plunger in operative connection with the tray moving means having a tapered shouldered terminal head adapted to engage the lower rim and eject a cup from a cup cavity into the receiving tube.

25. The combination with a cup filling and capping machine having a longitudinal trackway, a cup filler and capper, a cup holding tray slidably mounted on the trackway having longitudinally spaced open bottom cup receiving cavities, a reciprocable shouldered shift bar for intermittently moving the tray to place its cavities into registering positions with the filler and capper, and means for alternately actuating the tray and the filler and capper; of an open bottom receiving tube for filled cups having arresting devices, and a vertically movable plunger in operative connection with the tray moving means having a tapered shouldered terminal head adapted to engage the lower rim and eject a cup from a cup cavity upwardly through the receiving tube and into holding engagement with the arresting devices.

In testimony whereof we hereunto affix our signatures.

CHRISTIAN N. BERGMANN.
ELMER Z. TAYLOR.
CYRUS TAYLOR.
JOHN P. JENSEN.
WILSON A. FENN.